United States Patent
Xu et al.

(10) Patent No.: US 10,593,189 B2
(45) Date of Patent: Mar. 17, 2020

(54) AUTOMATIC TRAFFIC INCIDENT DETECTION AND REPORTING SYSTEM

(71) Applicant: DENSO International America, Inc., Southfield, MI (US)

(72) Inventors: Yunfei Xu, Milpitas, CA (US); Ravi Akella, San Jose, CA (US); Haris Volos, Sunnyvale, CA (US); Takashi Bando, Mountain View, CA (US)

(73) Assignee: DENSO International America, Inc., Southfield, MI (US)

( * ) Notice: Subject to any disclaimer, the term of this patent is extended or adjusted under 35 U.S.C. 154(b) by 2 days.

(21) Appl. No.: 16/037,622

(22) Filed: Jul. 17, 2018

(65) Prior Publication Data

US 2020/0027333 A1 Jan. 23, 2020

(51) Int. Cl.
| | |
|---|---|
| G08B 25/00 | (2006.01) |
| G06T 7/292 | (2017.01) |
| G06T 7/70 | (2017.01) |
| G06K 9/00 | (2006.01) |
| H04W 4/44 | (2018.01) |
| H04L 29/08 | (2006.01) |
| G08G 1/16 | (2006.01) |

(52) U.S. Cl.
CPC ....... G08B 25/006 (2013.01); G06K 9/00825 (2013.01); G06T 7/292 (2017.01); G06T 7/70 (2017.01); G08G 1/164 (2013.01); H04L 67/125 (2013.01); H04W 4/44 (2018.02); *G06T 2207/30256* (2013.01)

(58) Field of Classification Search
CPC ....... G08B 256/006; G06T 7/292; G06T 7/70; H04W 4/44
USPC ... 340/901–903, 425.5, 426.1, 539.1, 539.11
See application file for complete search history.

(56) References Cited

U.S. PATENT DOCUMENTS

| | | | |
|---|---|---|---|
| 7,348,895 B2 | 3/2008 | Lagassey | |
| 8,799,034 B1 | 8/2014 | Brandmaier et al. | |
| 9,491,420 B2 | 11/2016 | Mimar | |
| 2005/0065711 A1* | 3/2005 | Dahlgren | G07C 5/008 701/117 |
| 2006/0095199 A1* | 5/2006 | Lagassey | G07C 5/008 701/117 |

* cited by examiner

*Primary Examiner* — Daryl C Pope
(74) *Attorney, Agent, or Firm* — Harness, Dickey & Pierce, P.L.C.

(57) ABSTRACT

An automatic traffic incident detection and reporting system for a vehicle may include at least one of a plurality of cameras and a plurality of proximity sensors, an incident determination unit, a remote vehicle position determination unit, and a communication unit. The incident determination unit is configured to receive signals from the at least one of the plurality of cameras and the plurality of proximity sensors, detect whether incident involving at least one remote vehicle has occurred, and categorize the incident. The remote vehicle position determination unit is configured to receive signals from the at least one of the plurality of cameras and the plurality of proximity sensors and determine a location of the incident. The communication unit is configured to transmit data related to the incident to at least one of a cloud server and an emergency service provider.

17 Claims, 6 Drawing Sheets

AUTOMATIC TRAFFIC INCIDENT DETECTION AND REPORTING SYSTEM

FIELD

The present disclosure relates to automatic sensing by vehicles and, in particular, an automatic traffic incident detection and reporting system.

BACKGROUND

This section provides background information related to the present disclosure which is not necessarily prior art.

Many vehicles currently employ cameras and/or proximity sensors used for the vehicle's own benefits. The cameras and/or proximity sensors provide information to the vehicle's control system regarding the events and environment surrounding the vehicle. The vehicle then may use this information in executing its own systems and functions, such as automatic emergency brake, forward collision warning, lane departure warning, lane change assist, etc.

SUMMARY

This section provides a general summary of the disclosure, and is not a comprehensive disclosure of its full scope or all of its features.

An example automatic traffic incident detection and reporting system for a vehicle according to the present disclosure may include at least one of a plurality of cameras and a plurality of proximity sensors, an incident determination unit, a remote vehicle position determination unit, and a communication unit. The incident determination unit is configured to receive signals from the at least one of the plurality of cameras and the plurality of proximity sensors, detect whether incident involving at least one remote vehicle has occurred, and categorize the incident. The remote vehicle position determination unit is configured to receive signals from the at least one of the plurality of cameras and the plurality of proximity sensors and determine a location of the incident. The communication unit is configured to transmit data related to the incident to at least one of a cloud server and an emergency service provider.

The incident determination unit may be configured to analyze images from the plurality of cameras to determine whether the incident is a traffic accident.

The incident determination unit may be configured to either compare images from the plurality of cameras with known images of an acceptable roadway to determine whether there are potholes or debris on a roadway or use machine learning methods and models to automatically identify a road surface and any debris or damage to the road surface.

The external traffic incident may be one of a vehicle accident, an immobilized vehicle, a broken-down vehicle, a major pothole, and debris on the road.

The automatic traffic incident detection and reporting system may further include a vehicle position determination unit that is configured to determine a current position of the vehicle.

The automatic traffic incident detection and reporting system may further include a driver alert system that is configured to alert a driver when an incident is detected by the incident determination unit.

The automatic traffic incident detection and reporting system may further include a data transmission system configured to transmit data to the cloud server. The communication unit may be configured to transmit the incident location and incident category to the data transmission system, and the data transmission system may be configured to communicate the incident location and incident category to the cloud server.

The data may include at least one of image data, video data, global positioning data, and weather data.

An example method according to the present disclosure for automatically detecting and reporting traffic incidents includes receiving, by an incident determination unit and a remote vehicle position determination unit, a plurality of signals from at least one of a plurality of cameras and a plurality of proximity sensors disposed on a vehicle; detecting, by the incident determination unit, whether an incident involving at least one remote vehicle has occurred; categorizing, by the incident determination unit, a type of the incident from data gathered by the at least one of the plurality of cameras and the plurality of proximity sensors; determining, by the remote vehicle position determination unit, an incident location from the data gathered by the at least one of the plurality of cameras and the plurality of proximity sensors; and transmitting, by a communication unit, data related to the incident to at least one of a cloud server and an emergency service provider.

The method may further include analyzing, by the incident determination unit, images from the plurality of cameras; and determining, by the incident determination unit, whether there has been a traffic accident from the images.

The method may further include either comparing, by the incident determination unit, images from the plurality of cameras with known images of an acceptable roadway, or analyzing, by the incident determination unit, scene analysis algorithms; and determining, by the incident determination unit, whether there are potholes or debris on the roadway.

The method may further include an incident that is one of a vehicle accident, an immobilized vehicle, a broken-down vehicle, a major pothole, and debris on the road.

The method may further include determining, by a vehicle position determination unit, a current position of the vehicle.

The method may further include alerting, by a driver alert system, a driver when an incident is detected by the incident determination unit.

The method may further include transmitting, by the communication unit, the location of the incident and type of incident to a data transmission system on the vehicle, and communicating, by the data transmission system, the location of the incident and type of the incident to the cloud server.

An example method according to the present disclosure for detecting and handling incident reports at a cloud server may include monitoring, by a cloud server, a communications network for at least one incident report; verifying, by the cloud server, the validity of the at least one incident report; notifying, by the cloud server, an emergency services provider upon receiving and verifying the at least one incident report; reconstructing, by the cloud server, a scene of the incident from the at least one incident report; packaging the scene and at least one incident report into a data package; and sending, by the cloud server, the data package to a service provider for analysis.

The method may further include sorting, by the cloud server, the data from the at least one incident report into chronological order to reconstruct the scene of the incident, wherein the data is sorted according to timestamp information.

The method may further include evaluating the data, by the cloud server, to determine whether gaps exist in the data;

and requesting, by the cloud server, additional data from vehicles local to the incident if gaps exist in the data.

The method may further include comparing and corroborating, by the cloud server, a plurality of incident reports from multiple sources to verify the at least one incident report.

The method may further include handling incident reports having data from a traffic accident, a broken-down vehicle, an immobilized vehicle, a pothole, or debris in a road.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Vehicles are often equipped with various sensors (for example, cameras, LiDAR, sonar, radar, microphones, etc.) to support safety and navigation features on the vehicle. The present disclosure uses these sensors to detect incidents outside of the vehicle (for example, incidents involving one or more remote vehicles, persons, etc.) and share the detected incidents to other drivers and the community. Such incidents may include accidents, immobilized vehicles, broken-down vehicles, major potholes, large animal activity near the road, outlaw (amber alert or silver alert) vehicle detection, drivers or people in distress (for example, using facial recognition, body posture, hand signals/gestures, etc.), significant damage or debris on the road/side of road, severe weather, etc. The system of the present disclosure automatically detects the various incidents and shares them in a crowd source manner (for example, utilizing fog nodes and cloud systems). Other vehicles, authorities, and service providers (for example, insurance companies) may then utilize the reported information. For example, the information may be used to dispatch help if needed. In some cases, the information may be stored and combined with other vehicles' data to build a complete story of time-stamped, specific events surrounding the incident. Furthermore, the information gathered may be used in automatic data analysis to determine which areas and at which times are more prone to accidents, more likely to see large animal activity, etc.

Figure 1:
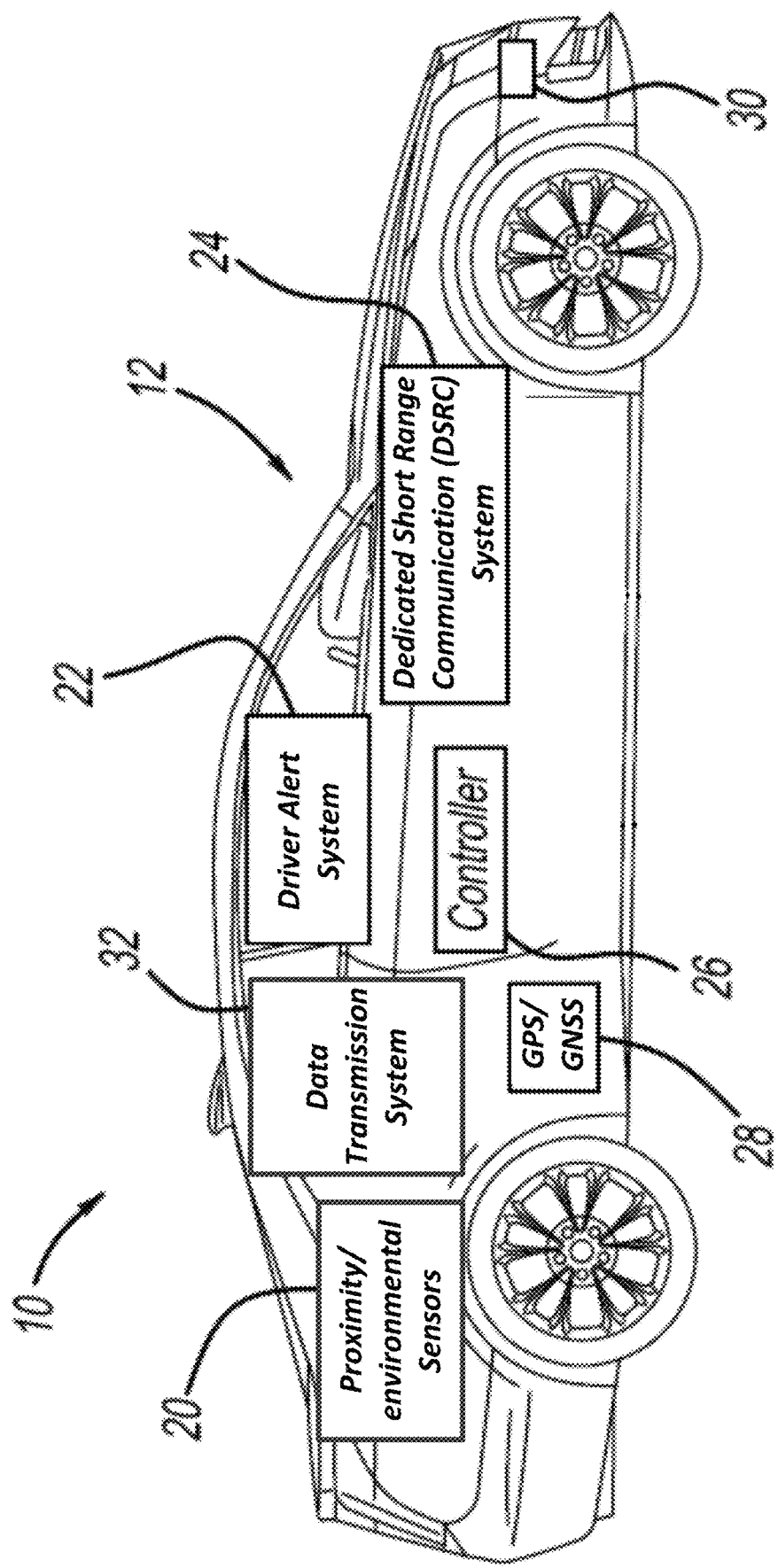
FIG. 1 illustrates a vehicle including a traffic incident detection and reporting system according to the present disclosure.

With reference to FIG. 1, a vehicle 10 including an automatic traffic incident detection and reporting system 12 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. Additionally, the system 12 may be incorporated in any stationary structure or moving structure as well. The system 12 is configured to automatically detect various incidents (for example only, accidents, immobilized vehicles, broken-down vehicles, and major potholes or debris in the road) and share them in a crowd source manner (for example, utilizing cloud systems). The system 12 may generally include one or more proximity and/or environmental sensors 20, a driver alert system 22, a dedicated short range communication (DSRC) system 24, a controller 26, a global positioning system (GPS) or global navigation satellite system (GNSS) 28, one or more cameras 30, and a data transmission system 32. While a DSRC system 24 is described herein, it is understood that the system 12 is not limited to utilizing a DSRC system 24. For example, the DSRC system 24 may be any V2X communication protocol or any cellular protocol.

The controller 26 can be any suitable controller for monitoring and/or controlling one or more of the proximity and/or environmental sensors 20, the driver alert system 22, the DSRC system 24, the GPS/GNSS 28, one or more of the cameras 30, the data transmission system 32 and/or the additional vehicle systems, sensors, and functions. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The proximity sensors 20 include one or more sensors configured to identify and/or detect the presence of objects, such as pedestrians, cyclists, or other vehicles, in one or more areas around the subject vehicle 10. The proximity sensors 20 can include any suitable sensors, such as any suitable radar, laser, camera, ultrasonic, LiDAR, sonar, stereo, or other suitable sensors for detecting objects in an area around the subject vehicle 10. The environmental sensors 20 can include sensors to determine light level, weather data, temperature, road surface status, traffic conditions, lane markers, etc. The proximity and/or environmental sensors 20 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10.

The one or more cameras 30 include one or more cameras configured to identify and/or detect the presence of objects, such as pedestrians, cyclists, or other vehicles, in one or more areas around the subject vehicle 10. The cameras 30 may also be used to record and/or detect the various incidents outside of and around the vehicle (for example, incidents involving one or more remote vehicles). Such incidents may include accidents, immobilized vehicles, broken-down vehicles, major potholes or debris, etc. The cameras 30 can include any suitable camera for detecting objects or incidents in an area around the subject vehicle 10 (for example only, audio, video, LiDAR, sonar, radar, etc.). The cameras 30 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10.

Figure 2:
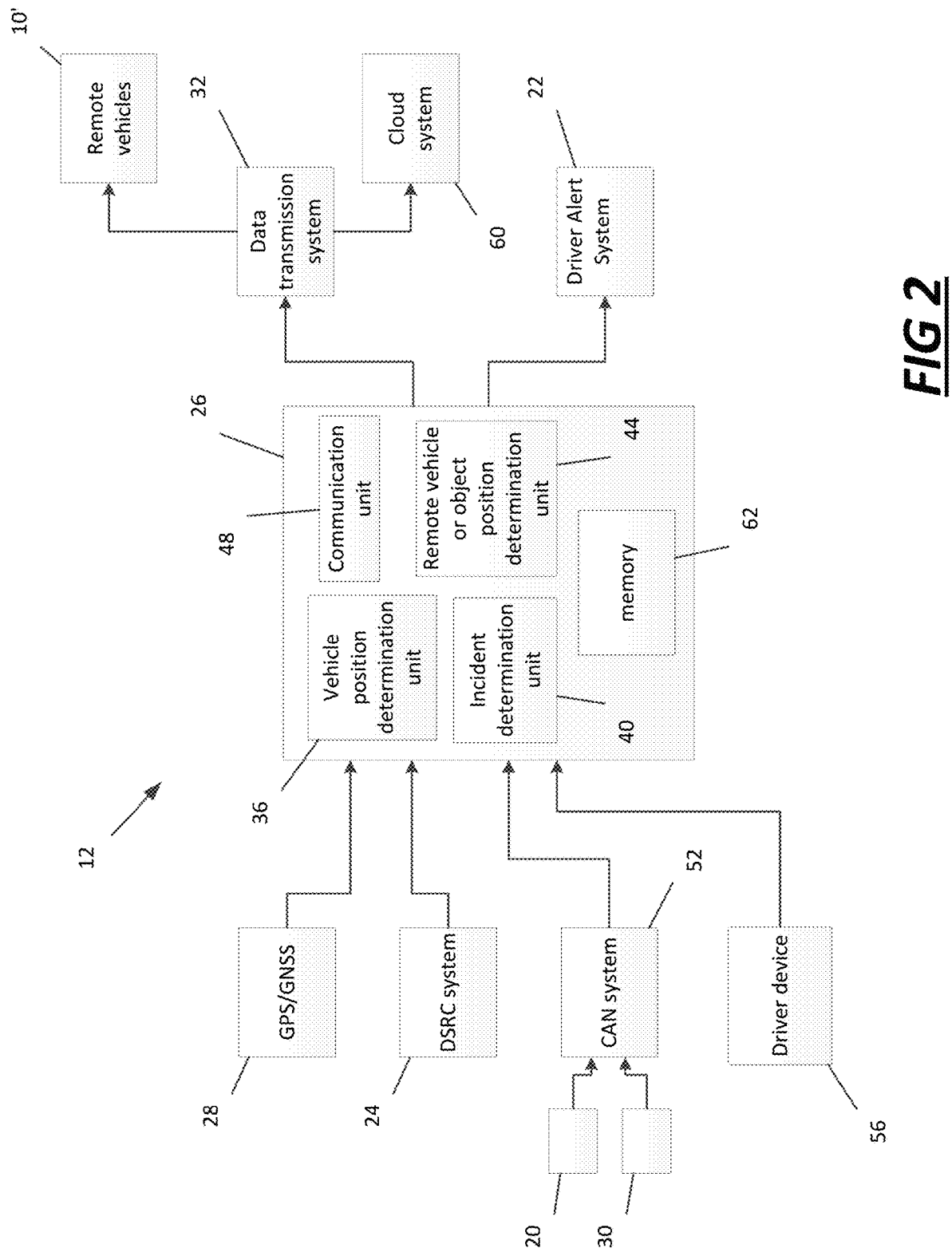
FIG. 2 is a schematic view of the traffic incident detection and reporting system of FIG. 1.
Figure 3:
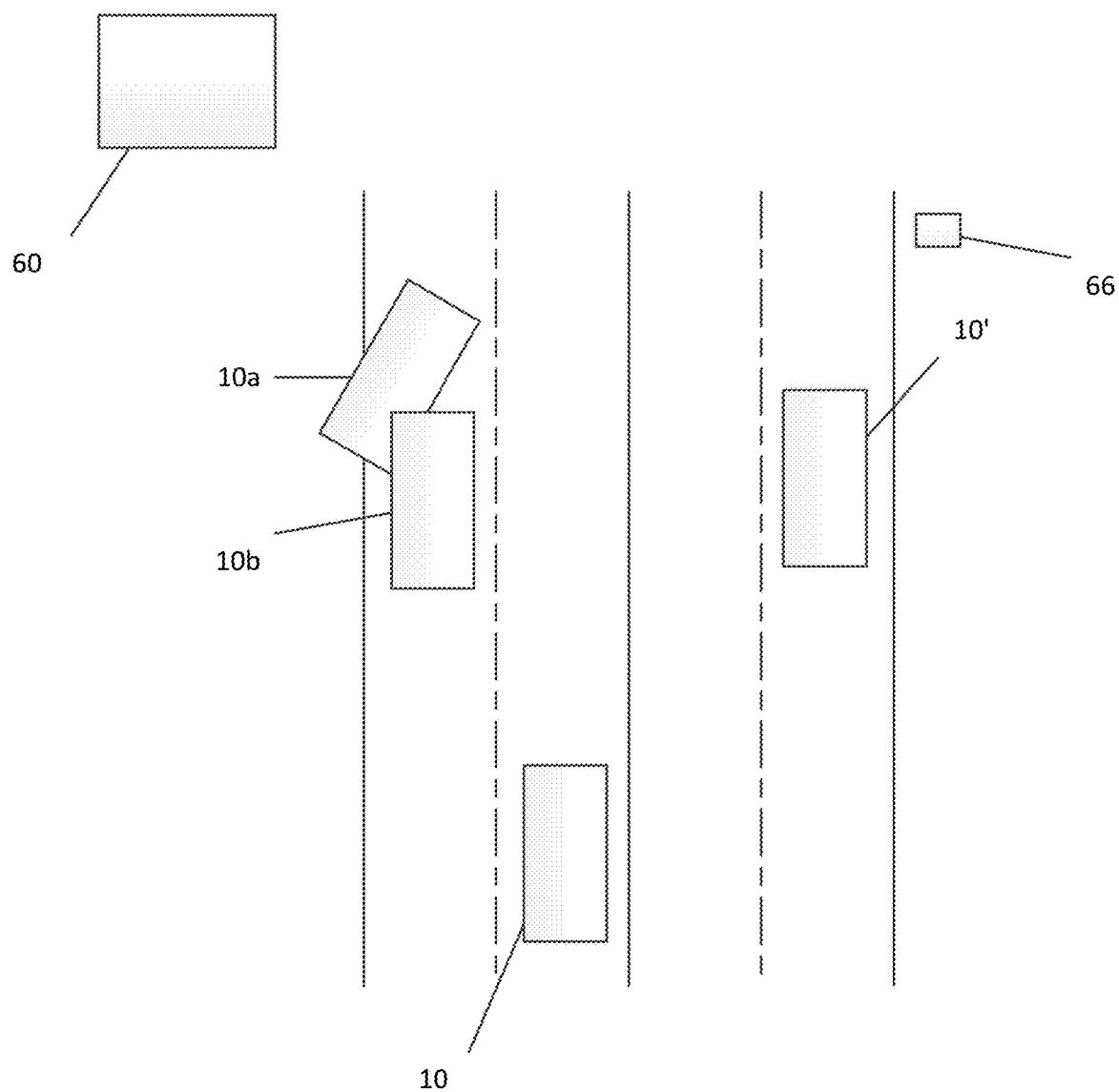
FIG. 3 is an illustration of several vehicles, where two vehicles are involved in an accident and at least one vehicle includes the traffic incident detection and reporting system of FIG. 1.
Figure 4:
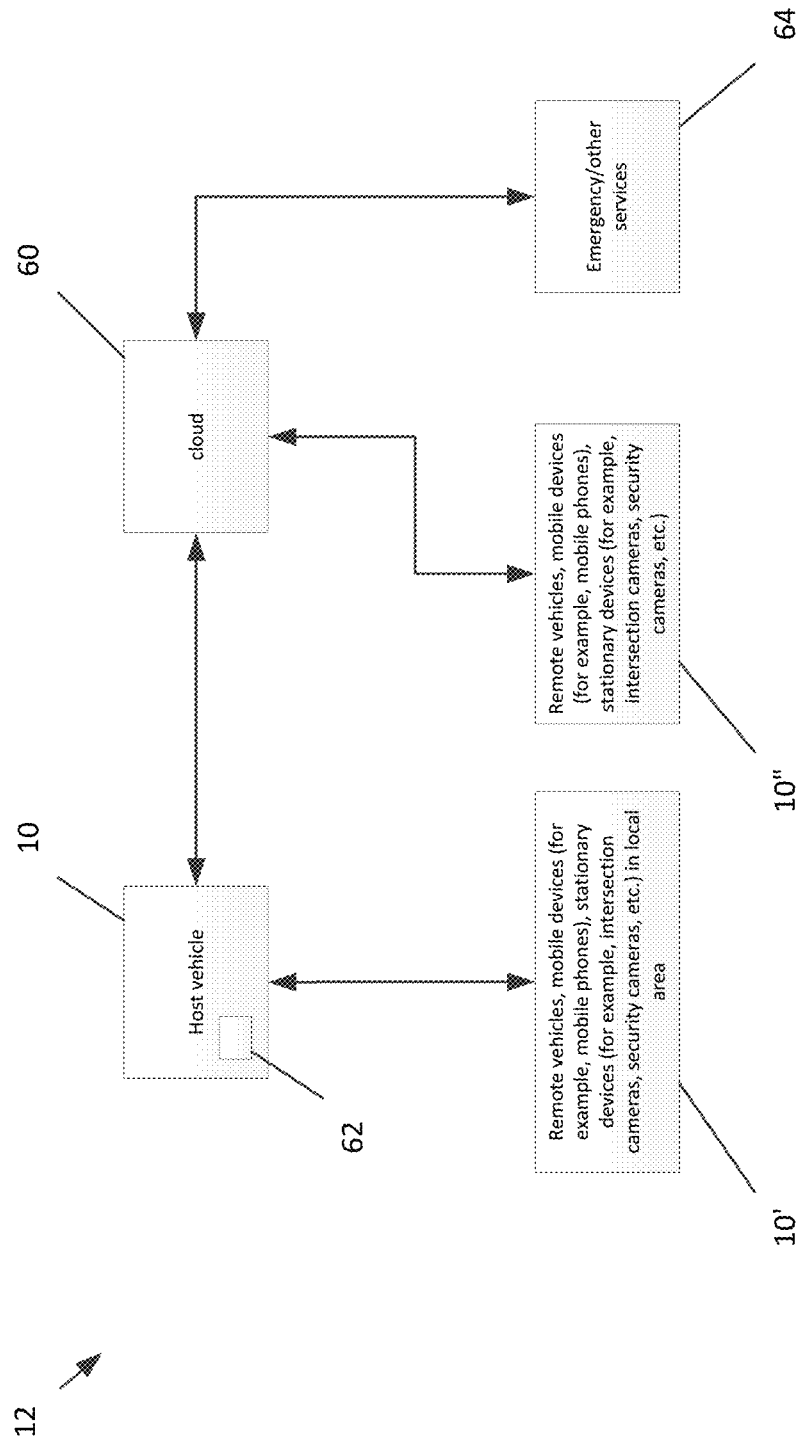
FIG. 4 is a schematic view of the traffic incident detection and reporting system of FIG. 1 interacting with external vehicle and non-vehicle systems.

Now referring to FIGS. 2-4, the system 12 is configured to automatically detect various incidents (for example only, accidents, immobilized vehicles, broken-down vehicles, major potholes or debris, etc.) and share them in a crowd source manner (for example, utilizing cloud systems).

The controller 26 may include a vehicle position determination unit 36, an incident determination unit 40, a remote vehicle or object position determination unit 44, and a communication unit 48. The vehicle position determination unit 36 may communicate with, and receive signals from, the GPS and/or GNSS 28 and/or the proximity and/or environmental sensors 20 and cameras 30 to determine a location of the vehicle 10. The proximity and/or environmental sensors 20 and cameras 30 may communicate with the vehicle position determination unit 36 through a Controller Area Network (CAN) system 52 or any other in-vehicle communication network.

The incident determination unit 40 may receive signals from the proximity and/or environmental sensors 20 and cameras 30. The incident determination unit 40 may use the proximity and/or environmental sensors 20 and cameras 30 to determine whether an incident has occurred outside of and around the vehicle (for example, incidents involving one or more remote vehicles, persons, etc.). The incident determination unit 40 may also determine a location and a type of traffic incident from the data transmitted from the proximity and/or environmental sensors 20 and cameras 30. Such incidents may include accidents, immobilized vehicles, broken-down vehicles, major potholes or debris in the road, etc.

For example, the incident determination unit 40 may determine that an accident has occurred by analyzing images from the cameras 30 to detect remote vehicle damage, remote vehicle status (such as whether driving, position of the vehicle relative to the road, location of the vehicle, etc.), status of driver (such as whether the driver is in the vehicle, out of the vehicle, alert, etc.), etc. In addition to the cameras 30, or in the alternative, the incident determination unit 40 may utilize the proximity and/or environmental sensors 20 to determine the information.

For example, the incident determination unit 40 may determine that an immobilized vehicle or broken-down vehicle is present by analyzing images from the cameras 30 to detect remote vehicle status (such as whether driving, position of the vehicle relative to the road, location of the vehicle, etc.), status of driver (such as whether the driver is in the vehicle, out of the vehicle, alert, etc.), etc. In addition to the cameras 30, or in the alternative, the incident determination unit 40 may utilize the proximity and/or environmental sensors 20 to determine the information.

For example, in some embodiments, the incident determination unit 40 may determine the occurrence of extreme road conditions, including major potholes, significant damage, or debris on the road/side of road, by analyzing images from the cameras 30 to detect features of the road or objects on the road that are unexpected. For example, the incident determination unit 40 may compare the images from the cameras 30 with images of an expected road or with images of known objects that may be on the road (for example road cones, barrels, signs, construction equipment, etc.). If the images from the cameras 30 do not match any of the images of known objects, then the incident determination unit 40 may determine that there is an occurrence of potholes, significant damage, or debris on the road/side of road. In addition to the cameras 30, or in the alternative, the incident determination unit 40 may utilize the proximity and/or environmental sensors 20 to determine the information.

Further, in some example embodiments, the incident determination unit 40 may detect the extreme road conditions by utilizing machine learning methods and models to automatically identify a road surface and any debris or damage to the road surface. For example, the incident determination unit 40 may use background detection and subtraction techniques to extract the foreground objects such as an adaptive Kalman filter that tracks objects from frame to frame, kernel density methods, mixture of gaussians, principal component analysis, and deep learning methods. Once the background is separated from the foreground objects, the objects are recognized using image recognition methods such as deep learning. The same is done for the background in order to identify certain features: quality and type of pavement, soil, vegetation, and other objects near and around the road/ground.

In addition to the proximity and/or environmental sensors 20 and cameras 30, the incident determination unit 40 may communicate with the DSRC system 24 (or any other V2X communication or cellular protocol) to determine remote vehicle and/or infrastructure information. For example, the DSRC system 24 (or any other V2X communication or cellular protocol) may communicate with a remote vehicle to determine whether an accident has occurred or whether there is an immobilized vehicle or broken-down vehicle in the vicinity. For example, the remote vehicle involved in the accident or that is immobilized or broken-down may communicate its status to the vehicle's DSRC system 24 (or any other V2X communication or cellular protocol).

In addition, or alternatively, the incident determination unit 40 may communicate with a driver's or passenger's device 56 either wirelessly or through wired or Bluetooth communications. The driver's or passenger's device 56 may include a mobile phone, a tablet, a laptop computer, a dash camera, or another electronic device. The driver's or passenger's device 56 may transmit camera images or remote vehicle data to the incident determination unit 40 for use similar to the proximity and/or environmental sensors 20, cameras 30, and DSRC (or any other V2X communication or cellular protocol) system 24.

The remote vehicle or object position determination unit 44 may determine GPS and/or GNSS position coordinates, or other location data, for the remote vehicle(s). For example, the remote vehicle or object position determination unit 44 may receive data from the proximity and/or environmental sensors 20, cameras 30, DSRC (or any other V2X communication or cellular protocol) system 24, and/or driver device and use the images, sensor data, or messages to determine one or more of GPS and/or GNSS position coordinates, street location, mile marker location, etc., of the remote vehicle(s).

For example, the remote vehicle or object position determination unit 44 may receive the current vehicle location from the vehicle position determination unit 36. The remote vehicle or object position determination unit 44 may also estimate a distance between the current vehicle and the remote vehicle(s) from the data from the proximity and/or environmental sensors 20, cameras 30, DSRC (or any other V2X communication or cellular protocol) system 24, and/or driver device. The remote vehicle or object position determination unit 44 may then adjust the current vehicle location by the distance between the current vehicle and the remote vehicle(s) to determine a position of the remote vehicle(s).

The communication unit 48 may receive data from the vehicle position determination unit 36, the incident determination unit 40, and the remote vehicle or object position determination unit 44 and communicate it to the data transmission system 32 or the driver alert system 22. For example, if there is a detected incident outside of and around the vehicle (for example, incidents involving one or more remote vehicles), the communication unit 48 may receive data indicating a position or location of the vehicle 10 from the vehicle position determination unit 36, the detected incident from the incident determination unit 40, and a location or position of the remote vehicle/incident/person from the remote vehicle or object position determination unit 44.

The driver alert system 22 may receive commands from the controller 26 to alert the driver. The driver alert system 22 may alert the driver by any means available, including but not limited to a driver information center (DIC) display, a heads-up display, an alarm, a radio, a steering while (for example with vibration), or a driver seat (for example with vibration).

The data transmission system 32 may receive commands from the controller 26 to distribute data to remote vehicle, mobile device, or stationary device 10' or remote server/cloud server 60. The cloud system 60 may then distribute the information to one or more remote vehicle s, mobile devices (for example, mobile phones, navigation systems, etc.), or stationary devices (for example only, intersection cameras, security cameras, etc.) 10" not in the local area (as opposed to vehicles, mobile devices, or stationary devices 10') and/or emergency or other services 64 (FIG. 4). The emergency or other services 64 may include police, fire, ambulance, etc., emergency services, insurance services, doctor or other medical non-emergency services, game wardens, park rangers, non-emergency law enforcement services, etc.

The data transmission system 32 may transmit information such as the position or location of the vehicle 10, the detected incident, and the location or position of the remote vehicle/incident/person. Additional information that may either be transmitted or saved for future transmission may be photos of videos of the incident/vehicle/person for use by emergency or other services.

In some examples, the controller 26 may include a memory 62 or other electronic storage to temporarily store or cache the incident information for later distribution. Examples of information that may be stored include, but are not limited to, snapshots or images of the incidents or accidents, videos of the incidents or accidents, incident location information, incident time information, weather metrics, details and statistics of large animal activities, a list of providers, services, or agencies (for example, emergency services—911, roadside assistance, operator assistance, animal control, animal studies, research institutions, insurance companies, weather service, roadwork services, or other providers).

For example, while the cameras 30, proximity sensors 20, and/or driver device 56 may be continuously taking images or video, the incident determination unit 40 may analyze image clips at a specified time interval. In some instances, the incident determination unit 40 may receive and analyze image clips every 6 seconds. While the incident determination unit 40 may analyze image clips at a specified time interval, the entire footage taken may be stored in the memory 62 and re-written when the memory 62 becomes full. For example only, the memory 62 may hold 32 gigabytes (GB) of data which is split between stored footage defined as incident footage and data that is continuously recorded from the cameras 30, proximity sensors 20, and/or driver device 56.

An example vehicle accident scenario is illustrated in FIG. 3. In the depicted example, vehicles 10a and 10b are involved in a traffic incident, in particular, a vehicle accident. Vehicles (or mobile devices or stationary devices) 10 and 10' are passerby vehicles.

In this scenario, the system 12 of vehicle 10 is continuously recording data through the vehicle's camera(s) 30, proximity or environmental sensors 20 (along with timestamp and GPS location), and/or driver device 56. The incident determination unit 40 is analyzing images at specified time intervals for incidents (for example, accidents involving remote vehicles or debris and potholes in the road). At the specified time interval, the incident determination unit 40 identifies the accident between vehicles 10a and 10b and packages recorded data of the incident from a predetermined timeframe before and after the specified time interval. For example only, the incident determination unit 40 may package data recorded 10 seconds before through 10 seconds after the specified time interval. The communication unit 48 then prepares the package including the data and transmits the package to the data transmission system 32 which transmits the data to the cloud system 60 (where the data can be accessed by the police and other services).

Data that may be recorded includes, but is not limited to, snapshots or images of the incidents or accidents, videos of the incidents or accidents, incident location information, incident time information, and weather metrics. The system 12 in the vehicle 10 may send the incident information immediately to emergency services through the communication unit 48, data transmission system 32, and cloud 60, as previously discussed, or the system 12 may store the data for later query in the memory 62. Additionally, remote vehicles, mobile devices, or stationary devices 10' or road infrastructure 66 may record image or video clips of the accident along with timestamp and GPS information which can be combined with the incident information collected by the system 12 to reconstruct the scene to assist police reporting and/or insurance companies in determining facts and fault.

Now referring to FIG. 4, the system 12 of the host vehicle 10 uses the various sensors 20, cameras 30, and driver devices 56 to detect incidents outside of the vehicle (for example, incidents involving one or more remote vehicles) and share information related to the detected incidents to other drivers and the community, either through local sharing (for example, DSRC, V2X communications, cellular communications, etc.) with remote vehicles, mobile devices, or stationary devices 10' in the local area or remote vehicles, mobile devices, or stationary devices 10" and services through a crowd sourcing manner (for example, utilizing remote servers or cloud systems). Such incidents, as previously stated, may include accidents, immobilized vehicles, broken-down vehicles, major potholes or debris in the roadway, etc. Examples of information that may be shared include, but are not limited to, snapshots or images of the incidents or accidents, videos of the incidents or accidents, incident location information, incident time information, weather metrics, etc.

The other vehicles, mobile devices, or stationary devices 10', 10", authorities 64, and service providers (for example, emergency services—911, roadside assistance, operator assistance, animal control, animal studies, research institutions, insurance companies, weather service, roadwork services, or other providers) 64 may then utilize the reported information. For example, the information may be used to dispatch help if needed. In some cases, the information may be stored and combined with other vehicles', mobile devices', or stationary devices' 10' data to build a complete story of time-stamped, specific events surrounding the incident (for example, the cloud 60 may stitch individual videos uploaded by various vehicles, mobile devices, or stationary devices 10, 10', 10"). Furthermore, the information gathered may be used in automatic data analysis to determine which areas and at which times are more prone to accidents.

As illustrated in FIG. 4, the host vehicle 10 may include the memory 62 or other electronic storage to temporarily store or cache the incident information (for example, snapshots or images of the incident, videos of the incident, incident location information, incident time information, weather metrics, etc.) for later distribution.

The host vehicle 10 may transmit the data through wireless, Bluetooth, DSRC, V2X communications, cellular communications, or other communications to remote vehicles, mobile devices, or stationary devices 10' in the local area or to a remote server or cloud server 60. The cloud server may be a logical server that is built, hosted, and delivered through a cloud computing platform over the internet. Cloud servers may possess and exhibit similar capabilities and functionality to a physical hardware server but are accessed remotely in a shared "virtualized" environment from a cloud service provider.

The incident information data may be stored in the cloud 60 long-term (for example, forever or until decided as not needed by a data retention policy). In addition to storage, the cloud 60 may calculate trends and statistics from the stored data (for example weather and large animal activity trends or accident occurrence statistics for a location).

Remote vehicles, mobile devices, or stationary devices 10" may pull the data or information from the cloud 60, for example, to prepare traffic routes, avoid back-ups or collisions, or for safety. Additionally, the historical analysis of the data in the cloud 60 may be used to create warnings at higher incident times of the day which can be sent to vehicles in the area. Emergency and other services 64 may also pull the data from the cloud 60, for example, to dispatch emergency vehicles or game wardens/park rangers, for insurance purposes, for accident reports, etc.

Figure 5:
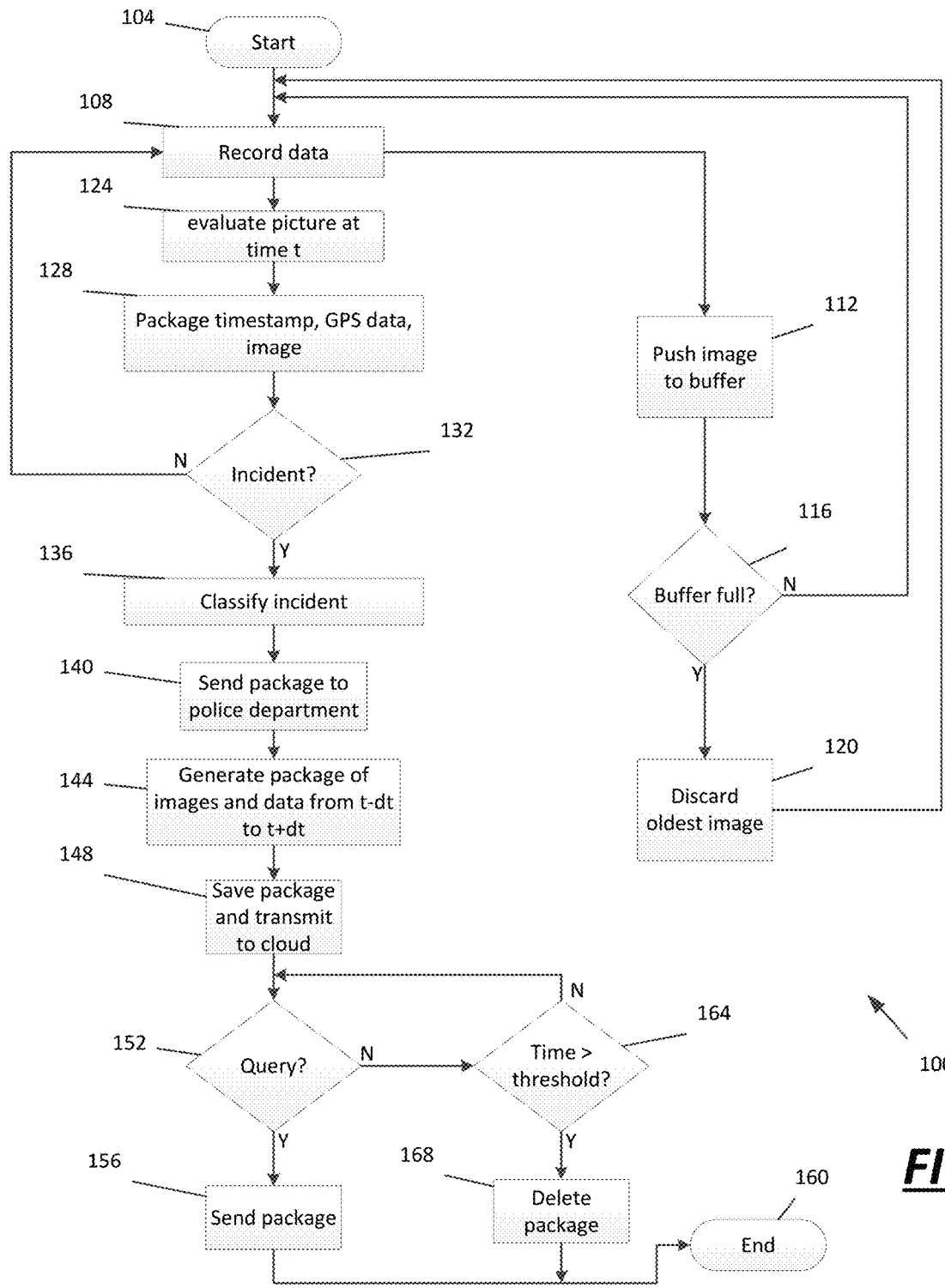
FIG. 5 is a flow chart illustrating an example method for outlaw vehicle detection reporting according to the present disclosure.

Now referring to FIG. 5, an example method 100 for outlaw vehicle detection reporting according to the present disclosure is illustrated. Method 100 begins at 104. At 108, data is continuously recorded by the cameras 30, proximity/environmental sensors 20, and driver devices 56. The recorded data may include, but is not limited to, snapshots or images, videos, location information, timestamp information, weather metrics, etc.

The recorded data is pushed to a buffer at 112 for storage. For example, the image is pushed to the buffer for short-term local storage or caching. The host vehicle 10 may include the memory 62 or other electronic storage to temporarily store or cache the information (for example, snapshots or images, videos, location information, time information, weather metrics, etc.) for later distribution. For example only, the memory 62 may hold 32 GB of data which is split between stored footage defined as incident footage and data that is continuously recorded from the cameras 30, proximity sensors 20, and/or driver device 56.

At 116, the method 100 determines whether the buffer is full. For example, to be effective for its specific intended use, the memory 62 is of a limited size. As such, the memory 62 only has the capability to store a limited number of images and related data. For example, the memory 62 may have the capacity to store within a range of 1 gigabyte to 1 terabyte of data. The space allotted to the continuously stored information may change based on whether any incidents have been identified and whether any incident data packages have been stored for later distribution. For example only, the buffer may be full if 70% of the 32 GB is in use.

If the buffer is full, the oldest image is discarded at 120 to make space for new images. For example, the images may be ordered according to the timestamp associated with each image. Thus, when the buffer becomes full, the image having the oldest timestamp is discarded and replaced with the image and data taken in step 108. If the buffer is not full at 116, the method 110 returns to 108.

At 124, images taken at time interval t are evaluated. For example, while the cameras 30, proximity sensors 20, and/or driver devices 56 may be continuously recording images or video, the incident determination unit 40 may analyze image clips at specified time intervals. In some cases, time t may be every 6 seconds.

At 128, the timestamp, GPS data, and image for each of the images taken at time interval t is packaged. For example, for each of the images taken, a timestamp and GPS location is recorded along with the physical image. All of the data collected for each image may be packaged for analysis.

At 132, the method 100 may determine whether there is an incident. For example, the incident determination unit 40 may analyze the data contents of the package from step 128 to determine whether an accident, a broken-down vehicle, an immobilized vehicle, a pothole, ore debris is present. In some cases, the incident determination unit 40 may use image comparisons (such as comparing vehicles for damage or comparing roadways for debris or potholes).

If there is not an incident, method 100 returns to 108. If there is an incident, method 100 classifies the incident at 136. For example, the incident determination unit 40 may analyze the data contents of the package from step 128 to determine an incident classification. As previously discussed, the incident may be one of a vehicle accident, an immobilized vehicle, a broken-down vehicle, a major pothole, or debris on the road. The incident determination unit 40 may determine the incident classification through image comparisons.

During incident classification, the severity of the incident may also be determined. For example, the incident determination unit 40 may analyze the photos to determine whether any driver is injured or unconscious. The photos may also be analyzed to determine whether there is a hostile situation between drivers.

At 140, the package is sent to the police department. As previously discussed, the package may be sent to the police department either directly or through the cloud 60. If there are any severe injuries or unconsciousness, medical personnel may also be notified.

At 144, an incident data package is generated including data from a predetermined timeframe before and after the specified time interval. For example only, the package may include data recorded 10 seconds before through 10 seconds after the specified time interval. The communication unit 48 may assemble data from the vehicle position determination unit 36, the incident determination unit 40, the remote vehicle or object position determination unit 44 and the memory 62 to generate the incident data package, which may include snapshots or images, video clips, timestamp data, vehicle location data, remote vehicle location data, weather data, etc., for a period of 10 seconds before through 10 seconds after the specified time interval.

At 148, the incident data package is stored in the memory 62 and sent to and stored within the cloud 60. The incident information data may be stored in the cloud 60, for example, forever or until decided as not needed by a data retention policy. In addition to storage, the cloud 60 may calculate trends and statistics from the stored data.

At 152, the method 100 determines whether there has been a query for the incident data package. The query may come from a service provider (for example, insurance, police, etc.) or from one of the individuals involved in the incident.

If a query was received, the package is sent to the party initiating the query at 156. The method then ends at 160. If a query was not received at 152, the method 100 determines whether an elapsed time is greater than a threshold at 164. For example only, the elapsed time may equate to a document retention policy and may be equal to approximately 2 years.

If the time is not greater than the threshold, method 100 returns to 152. If the time is greater than the threshold at 164, the package is deleted from the cloud at 168. The method then ends at 160.

Figure 6:
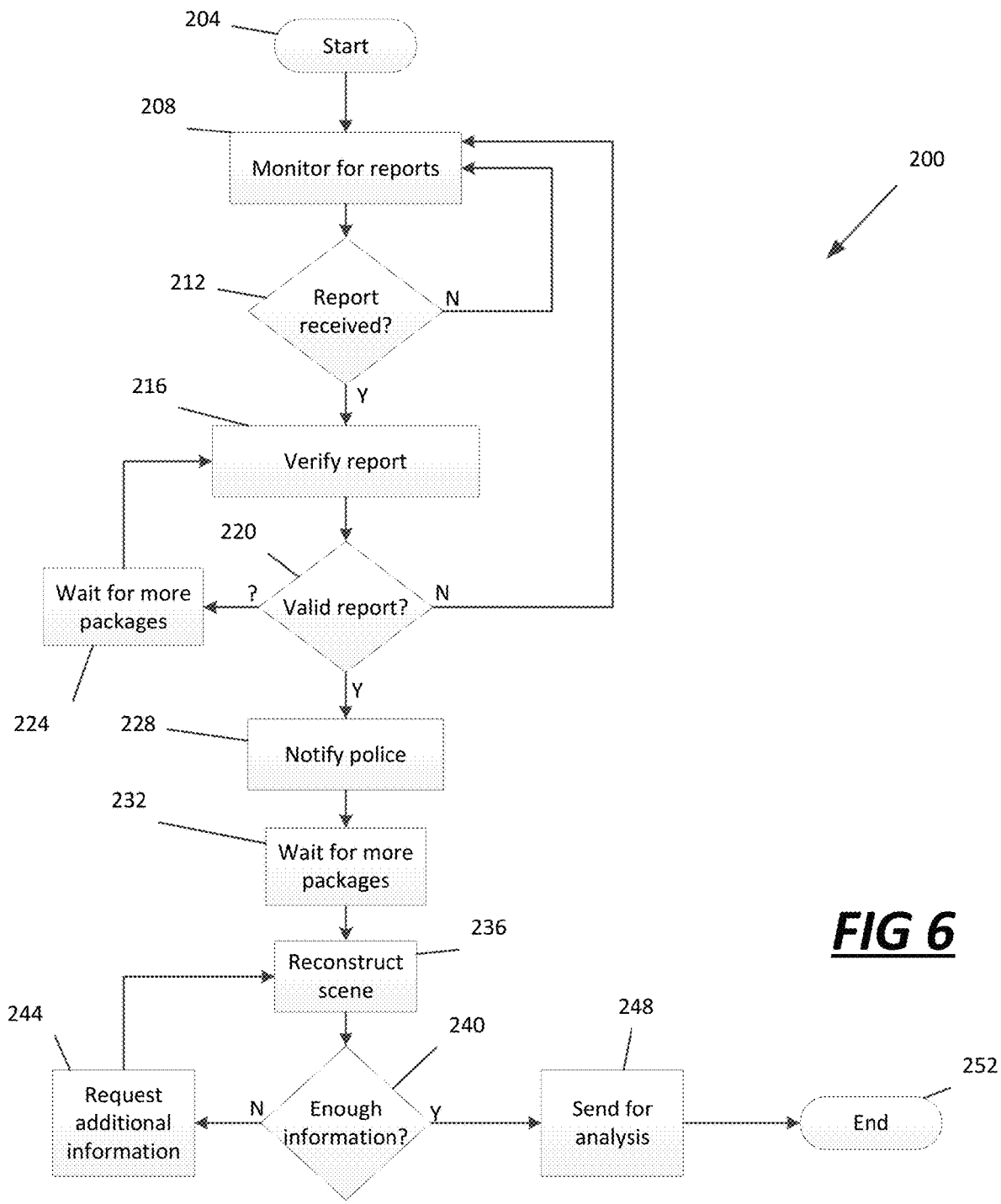
FIG. 6 is a flow chart illustrating an example method of receiving and reporting traffic incidents at a cloud according to the present disclosure.

Now referring to FIG. 6, an example method 200 of receiving and reporting traffic incidents at a fog node or cloud according to the present disclosure is illustrated. Method 200 starts at 204.

At 208, the cloud 60 monitors incoming data for notifications or reports sent from vehicles, mobile devices, or stationary devices 10, 10', 10". For example, data may be transferred to the cloud 60 through wireless, Bluetooth, or other communications. The cloud 60 may analyze the data upon reception to determine wither the data includes any notifications or data related to traffic incidents. As previously stated, the incidents may include accidents, broken-down vehicles, immobilized vehicles, potholes, or debris in the road.

At 212, method 200 determines whether a package, notification, or report has been received. For example, as previously discussed in relation to steps 144 and 148 in method 100 (FIG. 5), the communication unit 48 in vehicle 10 may take multiple packages including timestamp, GPS data, and image data that apply to the same incident classification (i.e., that apply to the identified accident, broken-down or immobilized vehicle, or pothole or debris) and format the contents and data for distribution. The cloud 60 may monitor the data networks to determine whether any packages have been sent from local vehicles, mobile devices, or stationary devices 10'. If no packages have been received, method 200 returns to 208.

If packages, notifications, or reports have been received at 212, the packages are verified at 216. For example, the cloud 60 may analyze the data in each package upon reception to determine whether the data includes notifications regarding an accident, broken-down or immobilized vehicle, or pothole/debris. The cloud 60 may also analyze the packages for authenticity. For example, the analysis may include verifying the encrypted vehicle ID, checksum of the report data, use of a decentralized certificate management authority system, etc.

At 220, the method 200 determines whether the package is a valid report. For example, the cloud 60 may analyze the data in each package to determine whether all necessary data (for example, timestamp, GPS data, and image data for each image) is present and whether all data is valid (for example, not corrupt). The cloud may validate the data by comparing and corroborating the findings in a plurality of incident reports from multiple sources and observing events consistent to the reported incident (e.g. broken down vehicle will cause traffic jams) or if the driver(s) reported or police already reported the event.

If the data is not valid, method 200 returns to 208. If it is not clear whether the data is valid at 220, method 200 waits for more packages at 224 and returns to 216. If the data is valid at 220, the police are notified at 228. For example only, the packages may be sent directly to the police department or other emergency services through the cloud 60 to notify the police of the incident.

At 232, method 200 waits for additional packages. As in 208 and 224, the cloud 60 monitors incoming packages containing data related to the identified incident. For example, additional data may be transferred to the cloud 60 through wireless, Bluetooth, or other communications from the vehicle 10 or from other vehicles, mobile devices, or stationary devices 10', 10".

At 236, the scene of the incident is reconstructed from the data in all packages received from all vehicles, mobile devices, or stationary devices 10, 10', 10". The cloud 60 may analyze and compile all packages received that relate to a single incident to reconstruct as much of the timeframe surrounding the incident as possible. For example, the cloud 60 may evaluate the timestamp information from all snapshot, image, video, GPS, etc., data to place all of the received data in chronological order. As such, the data may be viewed in the order, presumably, of the events of the incident.

At 240, the method 200 determines whether there is enough information to reconstruct the scene. For example, the cloud 60 may analyze the data after it is placed in chronological order to determine whether there are any missing portions of data (for example, periods of time). If data is missing, additional information is requested at 244 by pinging or pushing data requests to local vehicles, mobile devices, or stationary devices 10'. Method 200 then returns to 236.

If there is enough information at 240, the scene reconstruction and packaged data is sent for analysis at 248. For example, the data may be sent to the police, government agency, or other service for analysis.

The method ends at 252.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Spatial and functional relationships between elements (for example, between modules, circuit elements, semiconductor layers, units, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automatic traffic incident detection and reporting system for a vehicle, comprising:
    at least one of a plurality of cameras and a plurality of proximity sensors;
    an incident determination unit configured to receive signals from the at least one of the plurality of cameras and the plurality of proximity sensors, detect whether an incident involving at least one remote vehicle has occurred, and categorize the incident;
    a remote vehicle position determination unit configured to receive signals from the at least one of the plurality of cameras and the plurality of proximity sensors and determine a location of the incident; and
    a communication unit configured to transmit data related to the incident to at least one of a cloud server and an emergency service provider,
    wherein the incident determination unit is configured to either compare images from the plurality of cameras with known images of an acceptable roadway to determine whether there are potholes or debris on a roadway, or utilize machine learning methods and models to automatically identify a road surface and any debris or damage to the road surface.

2. The system of claim 1, wherein the incident determination unit is configured to analyze images from the plurality of cameras to determine whether the incident is a traffic accident.

3. The system of claim 1, wherein the incident is one of a vehicle accident, an immobilized vehicle, a broken-down vehicle, a major pothole, and debris on a road.

4. The system of claim 1, further comprising a vehicle position determination unit configured to determine a current position of the vehicle.

5. The system of claim 1, further comprising a driver alert system configured to alert a driver when an incident is detected by the incident determination unit.

6. The system of claim 1, further comprising a data transmission system configured to transmit data to the cloud server, wherein the communication unit is configured to transmit the location of the incident and incident category to the data transmission system, and the data transmission system is configured to communicate the location of the incident and incident category to the cloud server.

7. The system of claim 1, wherein the data includes at least one of image data, video data, global positioning data, and weather data.

8. A method for automatically detecting and reporting traffic incidents, comprising:
    receiving, by an incident determination unit and a remote vehicle position determination unit, a plurality of signals from at least one of a plurality of cameras and a plurality of proximity sensors disposed on a vehicle;
    detecting, by the incident determination unit, whether an incident involving at least one remote vehicle has occurred;
    either comparing, by the incident determination unit, images from the plurality of cameras with known images of an acceptable roadway, or employing, by the incident determination unit, scene analysis algorithms;
    determining, by the incident determination unit, whether there are potholes or debris on a current roadway;

categorizing, by the incident determination unit, a type of the incident from data gathered by the at least one of the plurality of cameras and the plurality of proximity sensors;

determining, by the remote vehicle position determination unit, an incident location from the data gathered by the at least one of the plurality of cameras and the plurality of proximity sensors; and transmitting, by a communication unit, data related to the incident to at least one of a cloud server and an emergency service provider.

9. The method of claim 8, further comprising:

analyzing, by the incident determination unit, images from the plurality of cameras; and determining, by the incident determination unit, whether there has been a traffic accident from the images.

10. The method of claim 8, wherein the incident is one of a vehicle accident, an immobilized vehicle, a broken-down vehicle, a major pothole, and debris on a road.

11. The method of claim 8, further comprising determining, by a vehicle position determination unit, a current position of the vehicle.

12. The method of claim 8, further comprising alerting, by a driver alert system, a driver when an incident is detected by the incident determination unit.

13. The method of claim 8, further comprising transmitting, by the communication unit, the incident location and type of incident to a data transmission system on the vehicle, and communicating, by the data transmission system, the incident location and type of incident to the cloud server.

14. A method of detecting and handling incident reports at a cloud server, the method comprising:

monitoring, by a cloud server, a communications network for at least one incident report including data for a traffic incident;

verifying, by the cloud server, a validity of the at least one incident report;

notifying, by the cloud server, an emergency services provider upon receiving and verifying the at least one incident report;

reconstructing, by the cloud server, a scene of the traffic incident from the at least one incident report;

sorting, by the cloud server, the data from the at least one incident report into chronological order to reconstruct the scene of the traffic incident, wherein the data is sorted according to timestamp information;

packaging the scene and the at least one incident report into a data package; and sending, by the cloud server, the data package to a service provider for analysis.

15. The method of claim 14, further comprising:

evaluating the data, by the cloud server, to determine whether gaps exist in the data; and requesting, by the cloud server, additional data from vehicles local to the traffic incident if gaps exist in the data.

16. The method of claim 14, further comprising comparing and corroborating, by the cloud server, a plurality of incident reports from multiple sources to verify the at least one incident report.

17. The method of claim 14, wherein the at least one incident report includes data from a traffic accident, a broken-down vehicle, an immobilized vehicle, a pothole, or debris in a road.

* * * * *